(12) United States Patent
Wolf

(10) Patent No.: US 6,223,660 B1
(45) Date of Patent: May 1, 2001

(54) TIMBER HAULING DEVICE

(76) Inventor: Johann Wolf, A-4644, Scharnstein (AT)

( * ) Notice: Subject to any disclaimer, the term of this patent is extended or adjusted under 35 U.S.C. 154(b) by 0 days.

(21) Appl. No.: 09/190,212

(22) Filed: Nov. 13, 1998

(30) Foreign Application Priority Data

Nov. 25, 1997 (AT) .............................................. A 1996/97-1

(51) Int. Cl.[7] ....................................................... B61B 7/02
(52) U.S. Cl. ...................... 104/173.2; 104/183; 104/178; 104/230; 105/3
(58) Field of Search ............................ 104/173.1, 173.2, 104/177, 178, 183, 230; 105/3

(56) References Cited

U.S. PATENT DOCUMENTS

| | | | |
|---|---|---|---|
| 3,473,486 | * 10/1969 | Harmon | 104/173.2 |
| 3,769,916 | * 11/1973 | Hogan | 104/173 R |
| 4,329,104 | * 5/1982 | Akiyama et al. | 414/139 |
| 4,754,825 | * 7/1988 | Scheffer | 180/7.5 |
| 5,655,584 | 8/1997 | Glawson . | |
| 5,820,066 | * 10/1998 | Jaramillo et al. | 242/557 |

FOREIGN PATENT DOCUMENTS

| | | |
|---|---|---|
| 2 263 117 | 10/1973 | (DE) . |
| 28 05 610 | 8/1979 | (DE) . |
| 28 49 149 | 5/1980 | (DE) . |

* cited by examiner

Primary Examiner—S. Joseph Morano
Assistant Examiner—Frantz F. Jules
(74) Attorney, Agent, or Firm—Young & Thompson

(57) ABSTRACT

A travelling device for hauling timber has a loading ramp (4) for the wood and a loading crane (5). Two cable drums (12, 13) with cables (18, 19) are attached to one frame (1), and one cable (19) can be attached in front of and the other cable (18) behind the device at a stationary point (20), and each cable drum (12, 13) can be driven for purposes of winding up the cable assigned to it. Using the cables (18, 19) the device can also be moved on steep or swampy terrain in which it is no longer possible to continue to move by means of conventional drives.

21 Claims, 4 Drawing Sheets

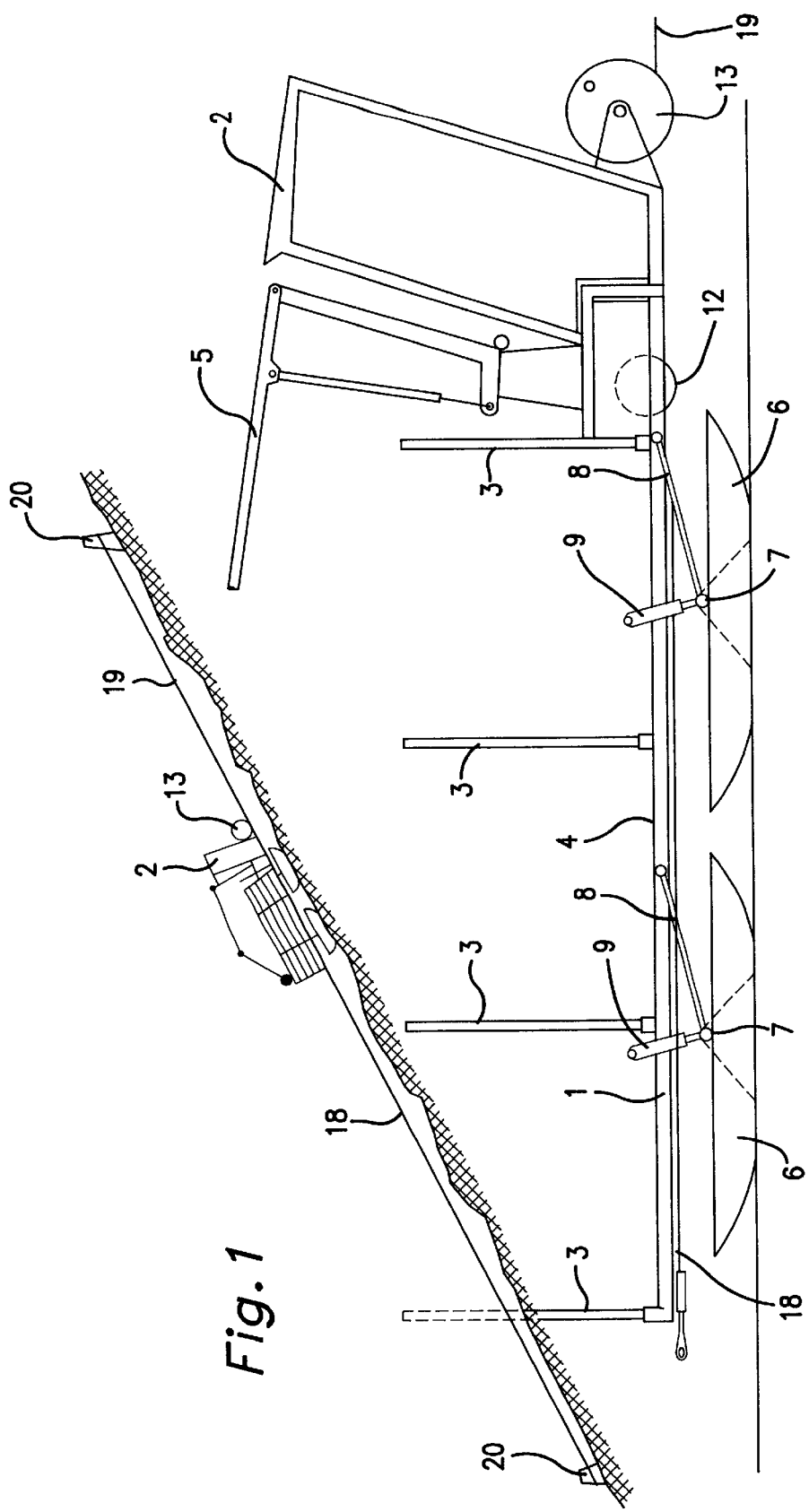

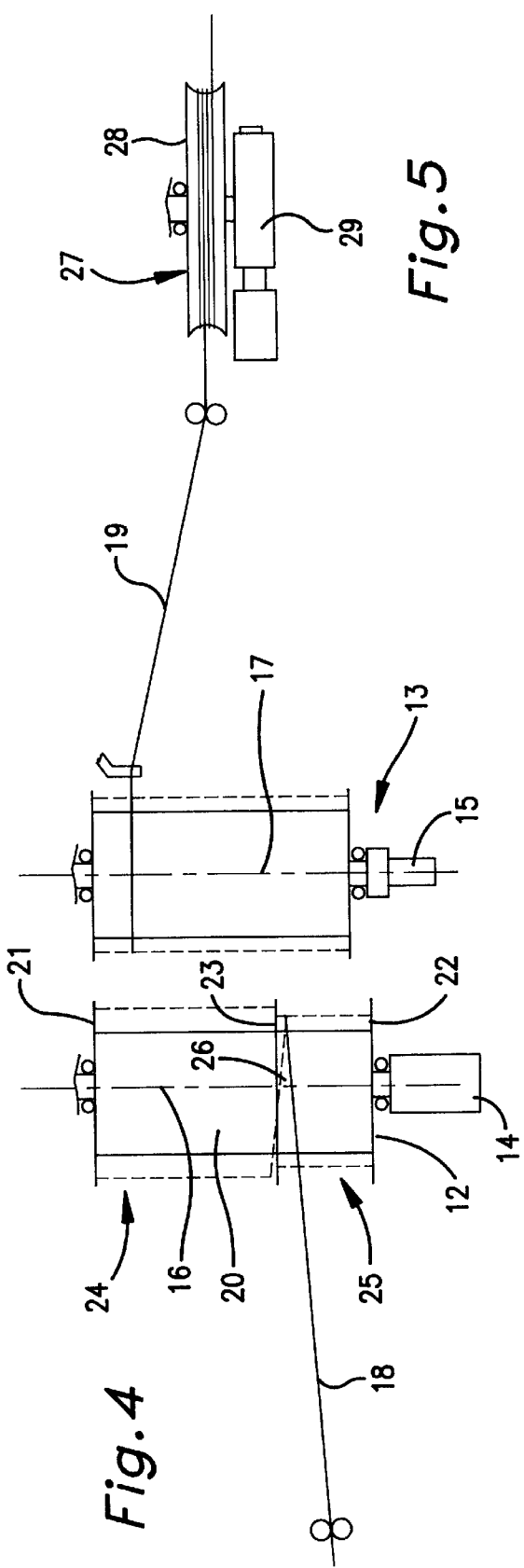
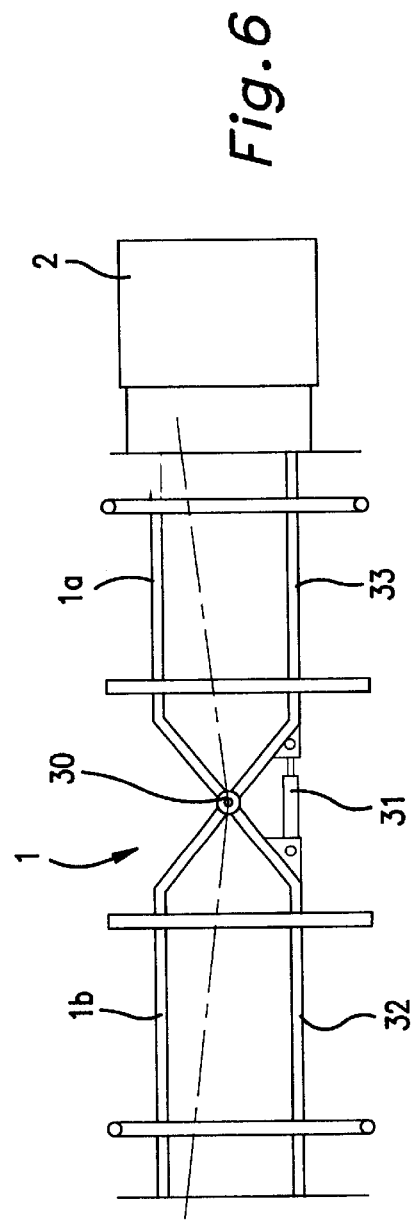
Fig.4
Fig.5
Fig.6

TIMBER HAULING DEVICE

BACKGROUND OF THE INVENTION

The invention relates to a traveling device for hauling timber with a loading ramp for the wood.

DESCRIPTION OF THE RELATED ART

In mountainous terrain or terrain passable only with difficulty by conventional, self-propelled vehicles, such as swampy areas, the removal of tree trunks or blocks is very difficult and is done for example with all-wheel tractors with attached kickback cylinder shield and cable winches or by means of cableways with a supporting and a traction cable. In both cases only very limited carrying capacity can be achieved, i.e. only individual trunks or trunks in small numbers can be transported at one time. In addition, the use of cableways is complex and expensive and the movement of cableway superstructures is time consuming. Tractors in turn can be used only with moderate steepness and sufficient supporting capacity of the ground.

SUMMARY OF THE INVENTION

The object of the invention is to devise a traveling device for hauling timber with a loading ramp for the wood which can also be used in terrain no longer passable for conventional, self-propelled vehicles.

This object is achieved with a device with the features of claim 1.

The device of the invention is not dependent on a conventional drive via wheels which presuppose sufficient wheel grip or the like for its locomotion in the two directions of travel, but can move up and down using the cables themselves in very steep terrain, good security against overturning of the vehicle being given by the cables.

BRIEF DESCRIPTION OF THE DRAWINGS

Other features and advantages of the invention derive from the following description of embodiments of the invention with respect to the drawings.

FIG. 1 shows the device as claimed in the invention on a mountain slope,

FIG. 2 shows a first embodiment of the device as claimed in the invention with skids, FIGS. 4 and 5 show embodiments of cable drums, FIG. 6 shows an overhead view of one version with a bendable frame and FIG. 7 shows another embodiment of the device as claimed in the invention.

DESCRIPTION OF THE PREFERRED EMBODIMENTS

Figure 3:
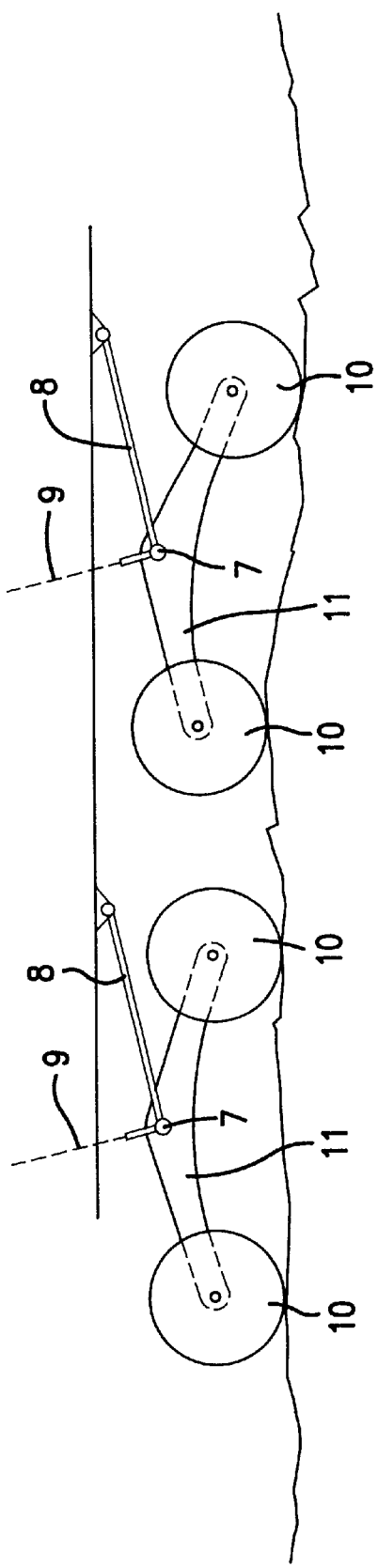
FIG. 3 shows the undercarriage of a second embodiment of the device as claimed in the invention with wheels.

As can be seen in FIG. 2, the device as claimed in the invention has a frame 1 with an operator's compartment mounted on its one end. The operator's compartment 2 is supported to be adjustable on frame 1 in its incline to frame 1 by mechanical means with a manual spindle or a hydraulic adjustment device in order to be able to match it to the respective slope of the terrain.

The frame 1 furthermore forms a loading ramp 4, for lateral support of the wood four vertical uprights 3 being provided. Between the loading ramp and the operator's compartment 2 there is a loading crane 5 for loading and unloading the loading ramp 4.

The loading crane 5 can have on the jib either hydraulically controlled grapplers for loading and unloading, or, as is conventional, instead of the grappler a harvester head which also collects and works the tree trunks.

In smaller embodiments of the device as claimed in the invention, the loading crane 5 can also be omitted. Loading of the device can also be done in these embodiments with the loading ramp 4 lowered and the side uprights folded up on the load side by hand by rolling on the blocks of wood.

In the embodiment of the invention shown in FIG. 2 the device is supported on the ground via skids 6 which are attached to be adjustable in their height relative to frame 1 and which are articulated via joints 7 with pendulum rods 8 and hydraulic cylinders 9.

FIG. 3 shows one alternative embodiment in which instead of skids 6 there are eight wheels 10, there being two axletrees at a time on one full floating axle frame 11. The full floating axle frames 11 in turn are connected, as described above, to the frame 1 to be vertically adjustable and articulated via pendulum rods 8 and hydraulic cylinders 9.

Instead of the four full floating axles, of course there can also be two or more conventional axles which are vertically adjustable if necessary relative to the frame 1.

In the area of the operator's compartment 2 a motor which is not shown is installed with a hydraulic pump which supplies all hydraulic means and especially the drive of the cable drums.

With reference to FIGS. 3–4, the device has two cable drums 12, 13 with the pertinent hydraulic drives 14, 15, 29. The axles 16, 17 of the cable drums 12, 13 are located transversely to the longitudinal direction or direction of movement of the device. One cable drum 13 is located on the front end of the device and the other is located in the area under the operator's compartment 2, the cable 18 of the latter cable drum 12 extending under the frame 1 of the device to the rear. But basically it is also possible for the cable drums 12, 13 to be located elsewhere on the device, for example the two cable drums 12, 13 can be located protected in the area under the operator's compartment 2 or the rear cable drum 12 can be located on the back end of the vehicle.

The drive 14, 15, 29 of the cable drums 12, 13 is designed such that the latter can be driven for purposes of winding up the cables 18, 19. The drive can thus be designed such that the torque acting on the cable drums 12, 13 is variable so that the torque can be reduced to a value at which in "idle" a very small torque is present which is enough to maintain a minimum tension of the cable 18, 19. Alternatively it can also be provided that in "idle" of the drive 14, 15, 29 no torque acts on the cable drums 12, 13 and they are braked via a mechanical or mechanical/hydraulic braking means. Finally it is also possible to drive the cable drums 12, 13 for purposes of rewinding of the cables 18, 19 to facilitate the unwinding of the cables 18, 19.

To load the device with tree trunks it is first aligned in the direction of the intended direction of travel, whereupon the cables 18 and 19 are secured to stationary points, for example tree stumps 20, as is shown in FIG. 1. Alternatively one or both cables 18, 19 can also be attached to the stationary point 20 before turning or alignment in order to execute or support turning. In mountainous terrain this takes place from timber access roads which are built ascending in contour lines, conventionally by alignment of the device towards the mountain and attachment of cables 18, 19 above and below the device.

To load the device with tree trunks, underneath the current position of the device the cable 19 which is now attached towards the mountain, for example to a tree stump 20, is unwound from the cable drum 13, at the same time the valley-side cable 18 which has likewise been withdrawn from the cable drum and which has been attached for example to a tree stump 20, is wound onto the drum 12. In doing so the device moves automatically down due to its own weight when the incline of the slope is sufficient, the mountain-side cable drum 13 being braked according to the desired speed of travel of the device or is driven for purposes of unwinding of the cable 19.

If during downwards motion of the device flat areas or obstacles appear so that the device stops, the valley-side drum 12 is driven for the purposes of winding up the cable 18 and the mountain-side cable drum 13 is switched to "idle". After passing the obstacles travel continues again as described above.

The cable drums 12, 13 are driven such that there is no danger of accelerated rolling or sliding of the device, preferably with a speed of 0.5 meters per second.

After the device has reached the tree trunks to be loaded, they are loaded on the loading ramp 4 and then the device is pulled up again using the cable drum 13.

If tree trunks are being loaded for example on the mountain side of a timber access road, first only the mountain-side cable 19 can be stretched short (for example, 30 meters) and secured to overcome a mountain-side slope, whereupon the device is pulled away from the road over the slope with the mountain-side cable drum 13. Then the mountain-side and valley-side cable 18, 19 are pulled off the cable drums 12, 13 such that they can be secured at the desired distance and the device is then pulled up using the mountain-side cable drum 13 and after loading is lowered again as described above, or pulled down when the inherent weight of the device is not enough to overcome obstacles for example.

In FIGS. 4 and 5 for example two embodiments of cable drums 12, 13 are shown, as can be used in the device as claimed in the invention.

The cable drum 12 shown in FIG. 4 consists of a cylindrical drum body 20, the storage area of the cable drum 12 being bounded by side walls 21, 22 and divided by a center ring 23 into two sections 24, 25. The section 24 is used as the storage area and the section 25 as the working area. This embodiment has the advantage that a narrower working area 25 for cable guidance is more favorable and can be dimensioned mechanically better according to the traction forces. In the working area 25 there is only the cable length which corresponds to the current requirements and which is shifted by a notch 26 in the center ring 23 from the storage area 24 onto the working area 25.

Cable drum 12 is driven via a hydraulic motor 14 which is shown only schematically and which drives a wormshaft of a worm gear pair, or directly by means of a hydraulic piston engine.

In the embodiment shown in FIG. 5 the cable drum 13 which is used here simply as a storage drum is connected downstream of a cable capstan 27 with a parabolic disk 28 and a hydraulic geared motor 29. The cable 19 is routed four to five times around the parabolic disk 28 and is driven by it. The cable drum 13 is used as mentioned simply as a storage drum and is driven permanently via a small hydraulic engine 15 for purposes of winding up the cable 19 in order to ensure sufficient adhesive frictional force on the parabolic disk 28. This embodiment offers the advantage that complex rewinding of the cable from the storage region 24 into the working region 25, as is the case in FIG. 4, is omitted and the cable is permanently available in the desired length, or the load on the cable drum 13 and the cable 19 wound thereon is reduced.

Since recently the trend has been more and more towards timbering year round, the device as claimed in the invention is configured such that the undercarriage (skids, wheels or tracks) can be easily replaced. In winter, with the ground frozen, skids are feasible, in summer, wheels, or for swampy ground, tracks make more sense. To support the cable drive the wheels or tracks can also be provided with an additional drive. In this case, on the frame 11 of the full floating axle there is a hydraulic engine which drives the wheels or tracked chassis for example by means of chains. In this case there can be either an engine for both axles or one motor at a time for each axle.

In alpine terrain it can happen that insurmountable formations form obstacles which must be bypassed. In many cases a minor evasion maneuver is enough to bypass the obstacle. In development of the invention it is therefore provided that the frame 1 is cut roughly in its middle into frame parts 1a and 1b and they are connected to one another via a joint 30, as is shown schematically in FIG. 6 in an overhead view. To execute the splitting movement there is a hydraulic cylinder 31 which engages the side longitudinal supports 32, 33 of the frame parts 1a, 1b.

Since in the case of a cable 18 which is routed as shown in FIG. 2 under the frame 1 (1a, 1b) the splitting motion is limited (this otherwise is also the case by loading) only minor compensation movements are possible which are sufficient in most cases for bypassing an obstacle. To prevent lateral pinching of the loaded tree trunks or blocks, the device should be made or loaded such that only two lateral vertical uprights 3 at a time per frame part 1a, 1b support the loaded material laterally.

The described device allows extensive loading since in contrast to cableway systems it is supported directly on the ground and at the same time optimum adaptation to the terrain is ensured by the described undercarriage. Since the device itself can be cabled up and down onto the timber access road, lateral displacement of the device without auxiliary means is also possible by obliquely drawing up or lengthening.

Figure 7:
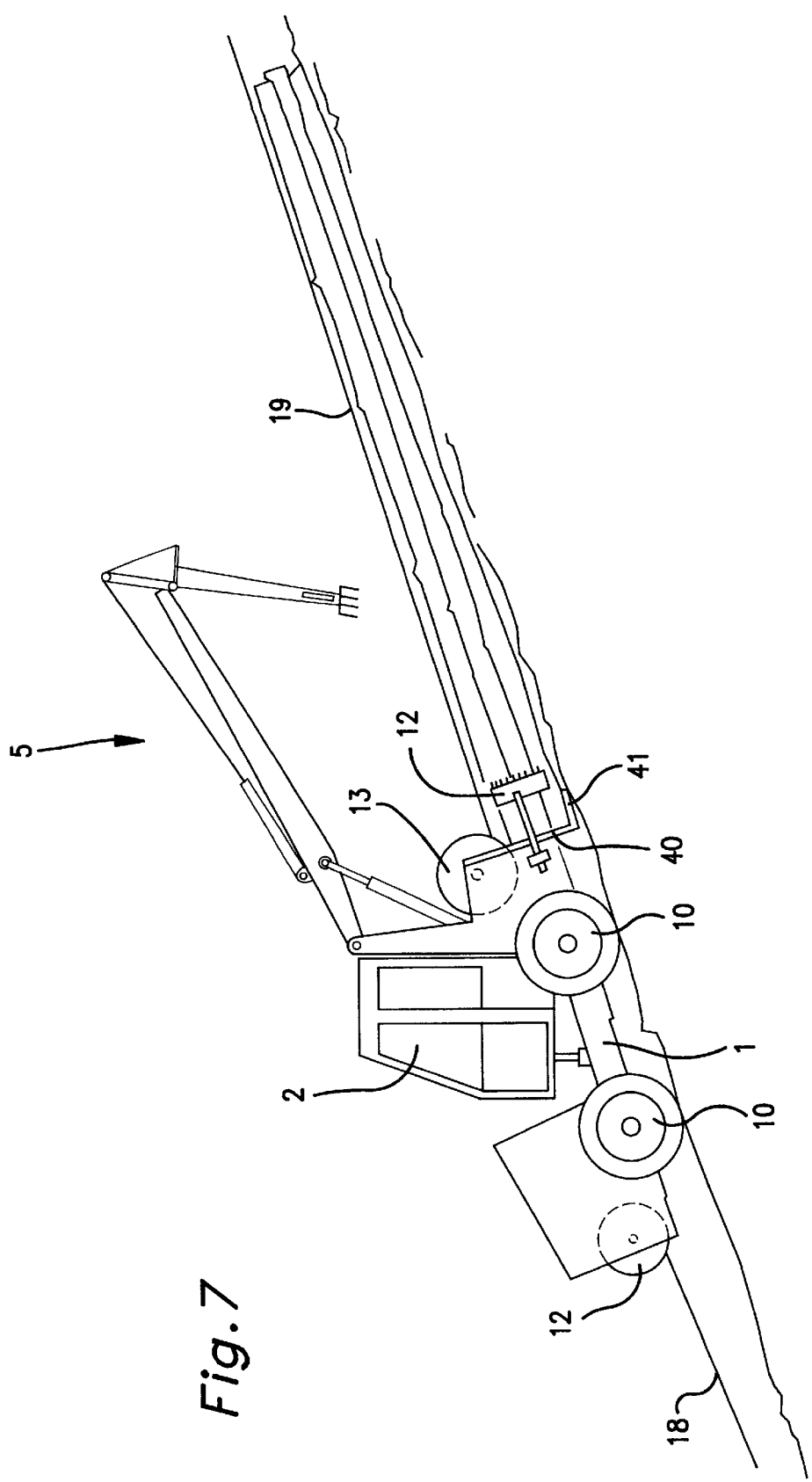

The embodiments of the device as claimed in the invention shown in FIGS. 1 through 6 have a loading area for the tree trunks or blocks to be transported. Conversely, the embodiment of the device as claimed in the invention shown in FIG. 7 is made without a loading area. The device shown in FIG. 7 likewise has a frame 1 on which optionally driven wheels 10 are supported. Alternatively to the wheels, as in the embodiment described using FIGS. 1 to 6, skids 6 can be mounted, for which measures can be taken which allow replacement of the wheels 10 by skids 6 and vice versa so that skids 6 and wheels can be mounted alternatively, depending on the terrain conditions.

The operator's compartment 2 can be tilted relative to the frame 1 of the device so that it can be tilted, therefore essentially placed perpendicular according to the slope of the terrain in which the device is being used. On one end of the device there is a crane 5; on its jib a hydraulically controlled grappler is possible for alignment of the tree trunks or blocks to be transported relative to the device.

In the device shown in FIG. 7 there are likewise two cable drums 12, 13 for the valley-side cable 18 and the mountain-side cable 19. In the embodiment as shown in FIG. 7, the alternative embodiment of the cable drums 12 and 13 described using FIG. 5 can be provided with a cable capstan 27.

On one end of the device 1, preferably the end which is on the mountain side when the device is being used, there is a shield 40 which viewed from the side is made roughly angular and has a bearing surface 41 which points away from the device for the tree trunks or blocks to be transported.

The shield 40 can be raised or lowered via a drive which is not detailed.

A hydraulically or mechanically actuated grappler 42 is assigned to the shield and engages the ends of the tree trunks or blocks which lie on the shield 40 or its bearing part 41 from the side and holds them on the shield 40. When with the embodiment of the device as claimed in the invention shown in FIG. 7 tree trunks or blocks are to be transported, they are placed using the loading crane and its grappler on the bearing part 41 of the shield 40, while the shield 40 is lowered, and then the hydraulic grappler 42 is actuated so that the tree trunks or blocks are held securely. At this point the device can be moved after lifting the shield 40 in the manner described above for the other embodiment in order to transport the tree trunks or blocks, the latter dragging on the ground with their ends facing away from the device during transport. In transporting tree trunks or blocks the shield 40 acts as protection ("ram shield") which prevents the tree trunks or blocks from damaging the device.

In summary, one embodiment of the invention can be described as follows.

A movable device for hauling timber has a loading ramp 4 for the wood and a loading crane 5. Two cable drums 12, 13 with cables 18, 19 are attached to one frame 1, and one cable 19 can be attached in front of and the other cable 18 behind the device at a stationary point 20, and each cable drum 12, 13 can be driven for purposes of winding up the cable assigned to it. Using the cables 18, 19 the device can also be moved on steep or swampy terrain in which it is no longer possible to continue to move by means of conventional drives.

What is claimed is:

1. A traveling device for hauling timber with a loading ramp for wood, comprising:

driven cable drums (12, 13) with cables (18, 19), a first of the cables being attachable in front of the device and a second of the cables (18) being attachable behind the device at a stationary point (20);

each of the cable drums (12, 13) being drivable for purposes of winding up the attached cable; and located on one end of the device, a means (40, 42) for holding ends of tree trunks or blocks to be transported.

2. Device as claimed in claim 1, wherein the means has an angled shield (40) with a bearing surface (41) projecting away from the device for the ends of the tree trunks or blocks.

3. Device as claimed in claim 2, wherein the shield (40) is mounted on the frame (1) of the device with the capacity to be raised and lowered.

4. Device as claimed in claim 1, wherein the means has a grappler-like clamping device (42) which can be placed laterally against the ends of tree trunks or blocks to be transported.

5. Means as claimed in claim 4, wherein the clamping device is made as a grappler.

6. Device as claimed in claim 5, where the jaws of the grappler (42) are located in the area of the shield (40).

7. A traveling device for hauling timber with a loading ramp for wood, comprising:

driven cable drums (12, 13) with cables (18, 19), a first of the cables being attachable in front of the device and a second of the cables (18) being attachable behind the device at a stationary point (20);

each of the cable drums (12, 13) being drivable for purposes of winding up the attached cable; and adjustable skids (6) attached by articulation (7) to a frame (1).

8. The device of claim 7, wherein the skids are vertically adjustable.

9. A traveling device for hauling timber with a loading ramp for wood, comprising:

driven cable drums (12, 13) with cables (18, 19), a first of the cables being attachable in front of the device and a second of the cables (18) being attachable behind the device at a stationary point (20);

each of the cable drums (12, 13) being drivable for purposes of winding up the attached cable; and four axles and two full floating frames, two axles at a time being attached to one of the two full floating axle frames (11), and at least one of the two full floating axle frames (11) being vertically adjustable by an hydraulic means.

10. A traveling device for hauling timber with a loading ramp for wood, comprising:

driven cable drums (12, 13) with cables (18, 19), a first of the cables being attachable in front of the device and a second of the cables (18) being attachable behind the device at a stationary point (20);

each of the cable drums (12, 13) being drivable for purposes of winding up the attached cable; and a frame (1) connecting to the loading ramp (4), the frame (1) having a center area with a hinge (30) for splitting the frame.

11. The device of claim 10, wherein the hinge splits the frame into two parts (1a, 1b) with only two vertical uprights (3) on each of the two parts (1a, 1b) of the frame (1).

12. The device of claim 10, further comprising an operator's compartment (2) and a loading crane (5).

13. The device of claim 10, further comprising an hydraulic drive (31) for splitting of the frame (1) around the hinge (30).

14. A traveling device for hauling timber with a loading ramp for wood, comprising:

driven cable drums (12, 13) with cables (18, 19), a first of the cables being attachable in front of the device and a second of the cables (18) being attachable behind the device at a stationary point (20);

each of the cable drums (12, 13) being drivable for purposes of winding up the attached cable; and a brake means associated with each cable drum (12, 13).

15. The device of claim 14, wherein each brake means includes an adjustable braking moment.

16. A traveling device for hauling timber with a loading ramp for wood, comprising:

driven cable drums (12, 13) with cables (18, 19), a first of the cables being attachable in front of the device and a second of the cables (18) being attachable behind the device at a stationary point (20);

each of the cable drums (12, 13) being drivable for purposes of winding up the attached cable; and a drive associated with each cable drum (12, 13).

17. The device of claim 16, wherein the cable drums comprise rotary axes (16, 17) arranged transversely to the direction of motion of the device.

18. The device of claim 16, further comprising:
a frame; and
two axles attached to the frame,
wherein one axle is vertically adjustable.

19. The device of claim 18, wherein the one axle is hydraulically vertically adjustable.

20. The device of claim 16, further comprising at least one driven wheel.

21. The device of claim 16, further comprising a tracked undercarriage.

* * * * *